(12) United States Patent
Chen

(10) Patent No.: US 10,763,987 B2
(45) Date of Patent: Sep. 1, 2020

(54) TRANSCEIVER WITH MULTI-WAVELENGTH COEXISTENCE

(71) Applicant: Peijuan Chen, Shanghai (CN)

(72) Inventor: Peijuan Chen, Shanghai (CN)

( * ) Notice: Subject to any disclaimer, the term of this patent is extended or adjusted under 35 U.S.C. 154(b) by 0 days.

(21) Appl. No.: 16/490,539

(22) PCT Filed: Feb. 26, 2018

(86) PCT No.: PCT/CN2018/077187
§ 371 (c)(1),
(2) Date: Aug. 31, 2019

(87) PCT Pub. No.: WO2018/157767
PCT Pub. Date: Sep. 7, 2018

(65) Prior Publication Data
US 2020/0014484 A1    Jan. 9, 2020

(30) Foreign Application Priority Data

Mar. 1, 2017  (CN) .......................... 2017 1 0117960
Mar. 1, 2017  (CN) ..................... 2017 2 0192988 U

(51) Int. Cl.
*H04B 10/40*    (2013.01)
*H04J 14/02*    (2006.01)
*G02B 6/293*    (2006.01)
*G02B 6/42*     (2006.01)
*H04B 10/25*    (2013.01)

(52) U.S. Cl.
CPC ...... *H04J 14/0213* (2013.01); *G02B 6/29386* (2013.01); *G02B 6/4246* (2013.01); *G02B 6/4281* (2013.01); *H04B 10/2589* (2020.05); *H04B 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0228632 A1* | 11/2004 | Maeda | ............... | H04B 10/2525 398/85 |
| 2007/0230878 A1* | 10/2007 | Nakazawa | ........... | G02B 6/4246 385/92 |
| 2007/0280695 A1* | 12/2007 | Li | ...................... | H04J 14/0282 398/135 |
| 2009/0214221 A1* | 8/2009 | Li | .......................... | H04B 10/40 398/136 |
| 2009/0269077 A1* | 10/2009 | Sone | ..................... | H04B 10/40 398/135 |

(Continued)

*Primary Examiner* — Omar S Ismail

(57) ABSTRACT

A transceiver with multi-wavelength coexistence is disclosed. A BOSA (bi-direction optical sub-assembly), a PCB (203) and a fiber receptacle (102) are disposed within a transceiver housing; the PCB (203) is horizontally arranged in the transceiver housing; the fiber receptacle (102) is disposed on the BOSA; the BOSA comprises multiple transmitters (0004) and multiple receivers (0003) all of which are optically coupled with the fiber receptacle (102) and electrically connected with the PCB (103); two or more BOSAs, which are stacked in parallel or perpendicular to the PCB (203), are disposed in the transceiver housing and respectively connected with an external fiber through multiple fiber receptacles (102).

16 Claims, 3 Drawing Sheets

(56) References Cited

U.S. PATENT DOCUMENTS

| | | | |
|---|---|---|---|
| 2010/0215359 A1* | 8/2010 | Li | H04B 10/40 398/22 |
| 2015/0086211 A1* | 3/2015 | Coffey | H04B 10/0795 398/116 |
| 2015/0098477 A1* | 4/2015 | Li | H04B 10/2589 370/535 |
| 2016/0036552 A1* | 2/2016 | Li | H04J 14/0257 398/49 |
| 2016/0352429 A1* | 12/2016 | Coffey | H04B 10/40 |
| 2017/0090121 A1* | 3/2017 | Wang | G02B 6/4263 |
| 2017/0093488 A1* | 3/2017 | Wang | G02B 6/4292 |
| 2018/0139520 A1* | 5/2018 | Xiao | G02B 6/2938 |

\* cited by examiner

TRANSCEIVER WITH MULTI-WAVELENGTH COEXISTENCE

CROSS REFERENCE OF RELATED APPLICATION

This is a U.S. National Stage under 35 U.S.C. 371 of the International Application PCT/CN2018/077187, filed Feb. 26, 2018, which claims priority under 35 U.S.C. 119(a-d) to CN 201710117960.X, filed Mar. 1, 2017 and CN 201720192988.5, filed Mar. 1, 2017.

BACKGROUND OF THE PRESENT INVENTION

Field of Invention

The present invention relates to the field of optical communication technology, and more particularly to packaging and application of single-fiber multi-wavelength bidirectional optical subassembly (BOSA) in a transceiver.

Description of Related Arts

Due to the rapid development of data centers, the industry has put forward a higher and higher requirement for the speed of transceivers. The requirement has promoted the rapid development and expansion of the transceiver industry. Ethernet transceivers are developing at an amazing speed from 10 Gb/s to 40 Gb/s, or even today's 100 Gb/s. Starting from a 40 GE (40 Gb/s Ethernet) module with a working distance larger than two kilometers, the module transmits data in a wavelength division multiplexing (WDM) manner, that is, using 4×10 Gb/s four-way parallel signals of CWDM (coarse wavelength division multiplexing) to reach a transmission rate of 40 Gb/s for being packaged in a QSFP (quad small form-factor pluggable) transceiver. This mode has been further developed in 100 GE modules with a working distance larger than two kilometers. The 100 GE modules now use 4×25 Gb/s four-way parallel signals of CWDM or LAN-WDM wavelength to achieve the transmission rate of 100 Gb/s for being packaged in a QSFP28 transceiver which is substantially as same as the QSFP in the size.

FIG. 1 is a schematic view of a fiber receptacle interface of an existing commercial QSFP or QSFP28 transceiver. The module has one transmitting port (corresponding to one TOSA) and one receiving port (corresponding to one ROSA), which is only able to achieve simultaneous transmitting and receiving of four different wavelength channels.

Furthermore, the existing international standard is to consider adding four-path wavelengths, achieving a transmission rate of 200 GB/s through 8×25 Gb/s. Users of the transceivers hope that the 8-channel module is still able to be packaged in the QSFP-DD transceiver which is substantially as same as the QSFP in the size. However, this method, which expands an original 4-path wavelength channel to an 8-path wavelength channel, will result in a more complicated design of the WDM multiplexer (MUX)/demultiplexer (deMUX) device, and increase the optical path difference between the eight channels and the manufacturing difficulty; or after the development of the original 4-path optical multiplexer into an 8-path optical multiplexer, further increase the channel insertion loss, and put forward higher requirements for optical path coupling and module manufacturing.

For the fiber interface of the transceiver, except that the short-distance transceiver (SR4, PSM4) with a speed rate of 40 GE or more adopts the MPO interface, most of the Ethernet transceivers use two LC receptacle interfaces, one of which is the light transmitter output interface and the other thereof is the light receiver input interface for completing the task of receiving and transmitting optical signals through the transceiver. In recent years, many manufacturers have developed a single-fiber bidirectional dual-channel module of cSFP (compact small form-factor pluggable) and even cSFP+ in order to improve space utilization, in which each channel is able to receive the receiving and transmitting signals independently; and however, due to manufacturing process limitations, transmitters and receivers of BOSA of this module generally use different wavelengths, which causes the cSFP(+) modules at both ends of the communication system to be paired, so that some inconveniences are brought to the user installation and operation. Further, when the communication protocol requires that the module must use a same wavelength set (such as the 40 G and 100 G LR4 protocols) to transmit and receive, this technology is helpless.

Therefore, the existing 8-transceiver-channel transceiver generally uses eight wavelengths MUX/deMUX, and is packaged in a larger OSA (such as CFP8), which greatly increases the size and the cost of the optical communication server. In order to package 8-channel bi-direction optical sub-assembly in the QSFP-DD module for mass production, there must be some new ideas.

SUMMARY OF THE PRESENT INVENTION

To solve the above technical problems, the present invention provides a transceiver with multi-wavelength coexistence for multi-channel communication, so as to achieve super multi-channel communication in a same transceiver. A BOSA (bi-direction optical sub-assembly), a printed circuit board (PCB) and an optical fiber connector are disposed within a transceiver housing; the PCB is horizontally placed in the transceiver housing; a fiber receptacle is connected with the BOSA; the BOSA comprises N transmitters and N receivers all of which are optically coupled with the fiber receptacle and electrically connected with the PCB; M BOSAs, which are stacked vertically or horizontally to the PCB, are disposed in the transceiver housing and respectively connected with an external optical fiber through M fiber receptacles, wherein M≥2 and N≥2.

According to one aspect of the present invention, the BOSA further comprises a WDM system and a single fiber bidirectional optical interface, wherein N transmitters respectively transmit N emitted light beams with different wavelengths, N receivers respectively receive N incident light beams with different wavelengths, the emitted light beams and the incident light beams enter and exit from the fiber receptacles, and share the WDM system and the single fiber bidirectional optical interface in the transmission path.

Preferably, there is at least one single fiber bidirectional optical interface.

Preferably, the single fiber bidirectional optical interface is an optical circulator.

According to another aspect of the present invention, the N transmitters and the N receivers are arranged in a one-to-one interlaced manner, and the N emitted light beams with different wavelengths and the N incident light beams with different wavelengths are transmitted in the one-to-one interlaced manner.

Preferably, a size of the BOSA is within 12 mm×36 mm×3.5 mm or 6 mm×36 mm×7 mm.

Preferably, the fiber receptacle is an LC interface or an MPO (multi-fiber push on) interface.

Preferably, the transceiver comprises one or two PCBs.

According to another aspect of the present invention, the transceiver further comprises a flexible PCBs (FLEX), wherein every BOSA is electrically connected with the PCB through the FLEX; every BOSA comprises PINs for the transmitters and PINs for the receivers, wherein the PINs for the transmitters are electrically connected with the PCB by the FLEX, the PINs for the receivers are electrically connected with the PCB by the FLEX.

Preferably, in the transceiver with multi-wavelength coexistence provided by the present invention, M=2 and N=4.

Compared with the prior art, the transceiver provided by the present invention has some advantages as follows. The volume of the transceiver is extremely compact by stacking the BOSAs with multi-wavelength coexistence in the horizontal or vertical direction. Compared with the transceiver in which the transmitter optical sub-assembly and the receiver optical sub-assembly are separately arranged in the prior art, the transceiver provided by the present invention is able to accommodate more signal channels and realize M×N channel communication through M BOSAs which are disposed within a transceiver housing of one transceiver. For QSFP-DD (quad small form factor pluggable—double density), the 8-wavelength-channel communication is realized through two single-fiber bidirectional BOSAs.

DETAILED DESCRIPTION OF THE PREFERRED EMBODIMENT

In order to better understand and explain the present invention, the present invention will be further described with accompanying drawings in detail.

Figure 1:
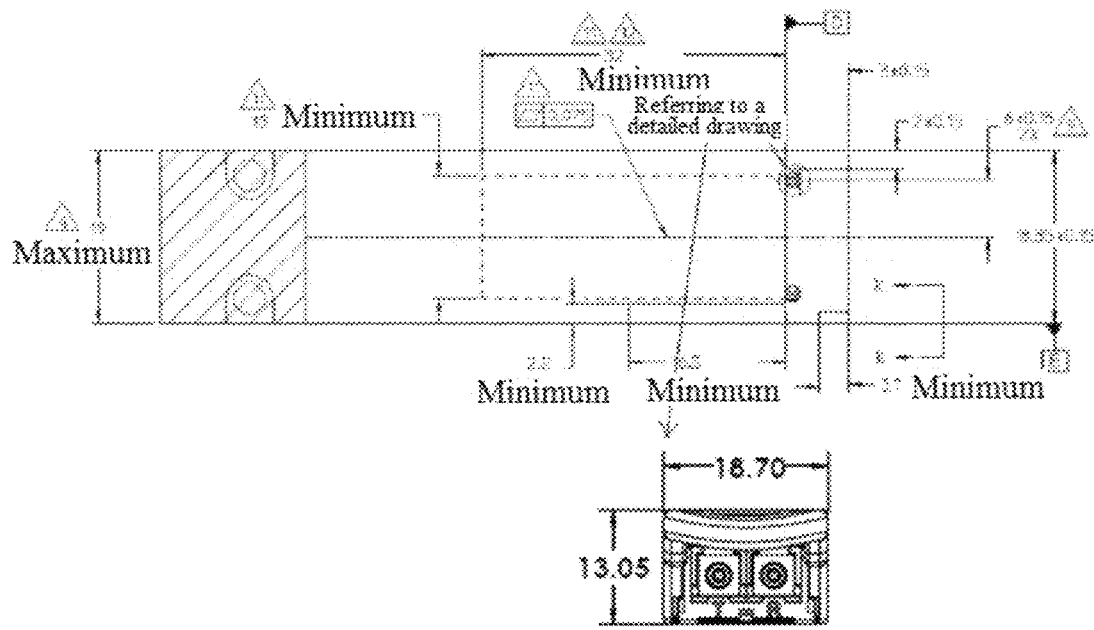
FIG. 1 is a schematic view of a fiber receptacle of an existing commercial QSFP (quad small form—factor pluggable) or QSFP28 transceiver.
Figure 2:
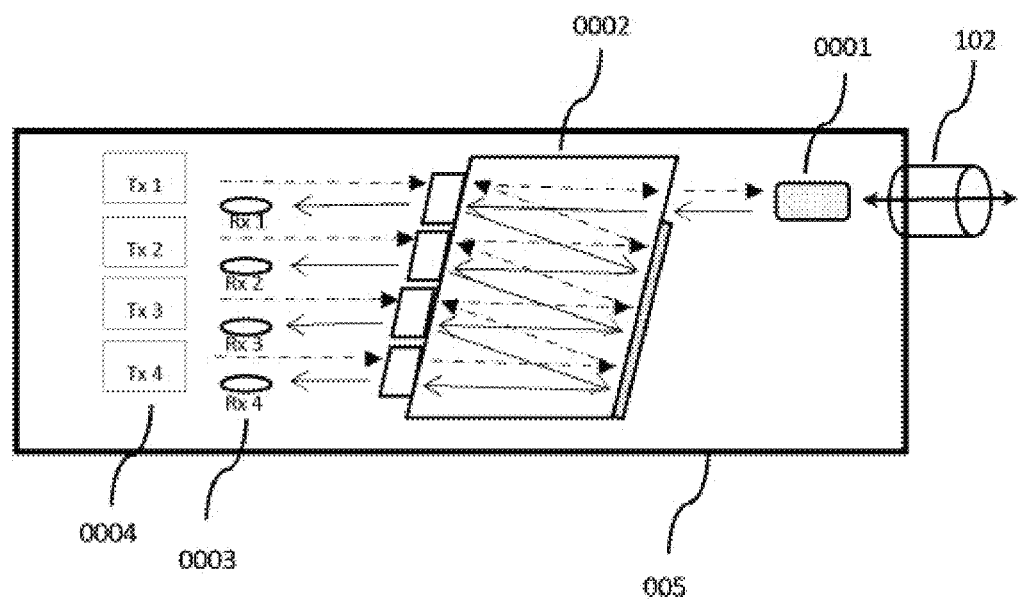
FIG. 2 is a schematic view of a BOSA (bi-direction optical sub-assembly) which is able to be stacked vertically in the transceiver provided by the present invention.

FIG. 2 is a structurally schematic view of a BOSA (bi-direction optical sub-assembly) which is able to be stacked vertically in a transceiver housing provided by the present invention. Currently, a transceiver with QSFP (quad small form-factor pluggable) package size generally adopts a free space micro-optical device or a planar optical waveguide device to realize a function of internal MUX/deMUX in an OSA. Here, OSA is an abbreviation for optical sub-assembly. If the OSA only has light transmitting function, it is called TOSA (transmitter optical sub-assembly); if the OSA only has light receiving function, it is called ROSA (receiver optical sub-assembly). Moreover, when the OSA has both light transmitting and receiving functions on a single optical interface, it is called BOSA (bi-direction optical sub-assembly).

As shown in FIG. 2, reference numeral 0003 refers to N receiving channels, the receiver of each receiving channel comprises a photodiode, a TIA (trans-impedance amplifier), a reflector and multiple coupling lenses, wherein the N receiving channels receive different wavelengths. Reference numeral 0004 refers to N transmitting channels, the transmitter of each transmitting channel comprises a laser chip and multiple collimating lenses which are adapted for concentrating laser transmitted from the laser chip into a collimating beam, wherein a wavelength of each transmitting channel is as same as a wavelength of a corresponding receiving channel. For example, a wavelength of Tx1 is as same as a wavelength of Rx1, a wavelength of Tx2 is as same as a wavelength of Rx2, and the rest may be deduced by analogy. Without loss of generality, take N=4 here for an example explanation. Reference numeral 0002 refers to a MUX/deMUX which comprises a main light transmitting block and multiple optical thin-film filters (TFFs), wherein the main light transmitting block has a first surface, a second surface opposite to the first surface and a light window on the first surface, the first surface is a fully reflecting surface, the multiple TFFs are disposed on the second surface. In one embodiment, the incident lights are incident from the light window on the first surface of the main light transmitting block, reach the second surface, respectively pass through the multiple TFFs, are emitted from the main light transmitting block, and respectively enter the receivers (such as Rx1, Rx2, Rx3 and Rx4) through a focusing and reflecting system; and simultaneously, lights transmitted by the transmitters (such as Tx1, Tx2, Tx3 and Tx4) which are interlaced with the receivers respectively pass through the TFFs and the main light transmitting block to form a synthetic wave, and finally the synthetic wave is emitted from the light window.

Reference numeral 0001 refers to a single fiber bidirectional optical interface and here, is embodied as a small optical circulator. Three ports (namely, a light transmitting port, a light receiving port and a public port) of the optical circulator are in butt joint with an output light position, an incident light position and a fiber receptacle of the transceiver housing, respectively. In one embodiment, the fiber receptacle is an optical fiber connector. Accordingly, an optical signal emitted from the light window of the WDM system 0002 passes through the optical circulator 0001, enters a fiber receptacle 102 on the BOSA 005 through the public port of the optical circulator; a collimated optical signal from the fiber receptacle 102 enters the WDM system 0002 through the light receiving port of the optical circulator to be demultiplexed, and then is absorbed by the receivers 0003.

It is able to be understood by those skilled in the art that, if the WDM system adopts a planar optical waveguide structure, multiple single fiber bidirectional optical interfaces respectively corresponding to multiple channels are needed, namely, multiple optical circulators are needed. As a result, the uplink output and the downlink receiving of the multi-channel wavelength signal light are realized by a single fiber receptacle 102, so that a flat single-fiber bidirectional multi-wavelength-channel BOSA is formed, which is controlled within 12 mm×36 mm×3.5 mm in size and is able to be packaged within a QSFP-DD (quad small form factor pluggable—double density) transceiver with a standard size of 18.35 mm×72 mm×8.5 mm, and a transceiver is able to be provided with two BOSAs stacked vertically inside.

It is also able to be understood by those skilled in the art that the fiber bidirectional optical interface may be a 50% reflection and 50 transmission glass piece which is also able to achieve an effect of single-fiber bidirectional optical transmission. In addition, according to the present invention, M BOSAs are able to be disposed within the transceiver housing, each BOSA comprises N transmitters and N receivers all of which are optically coupled with the fiber receptacle and are electrically connected with the PCB. In the transceiver package mode of FIG. 2, M=2, N=4, but M and N are not limited thereto, and may be any integer greater than or equal to 2. For example, in order to realize the 8-channel transmission, M=2 and N=8, or another scheme of M=4 and N=4 is adopted.

Figure 3:
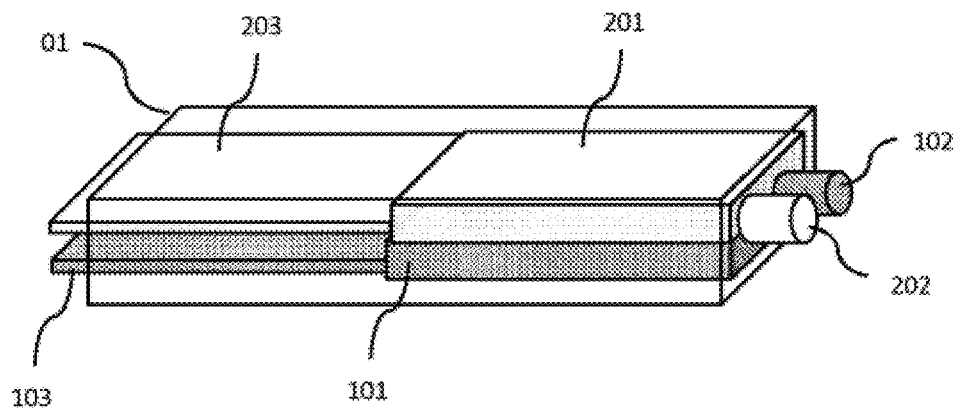
FIG. 3 is a structurally schematic view of BOSAs which are stacked vertically in the transceiver according to a preferred embodiment of the present invention.
Figure 4:
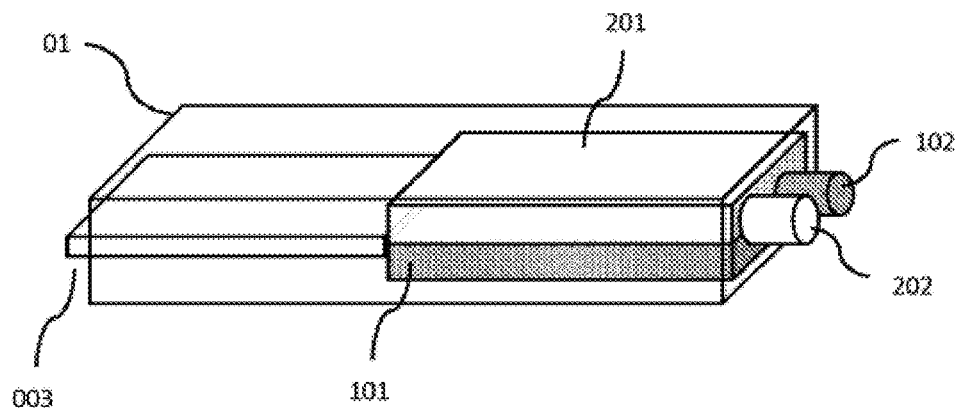
FIG. 4 is a structurally schematic view of BOSAs which are stacked vertically in the transceiver according to another preferred embodiment of the present invention.

Further, as shown in FIG. 3, reference numeral 101 refers to a first four-wavelength-channel BOSA disposed within a transceiver housing, reference numeral 102 refers to a fiber receptacle on the first four-wavelength-channel BOSA, reference numeral 103 refers to a PCB which matches with the first four-wavelength-channel BOSA and is connected with the first four-wavelength-channel BOSA 101 through the FLEX; reference numeral 201 refers to a second four-wavelength-channel BOSA disposed within the transceiver housing stacked on the first four-wavelength-channel BOSA, reference numeral 202 refers to the fiber receptacle on the second four-wavelength-channel BOSA, reference numeral 203 refers to a PCB which matches with the second four-wavelength-channel BOSA and is connected with the second four-wavelength-channel BOSA 201 through the FLEX, all of which are disposed within a transceiver housing 01, so as to realize the photoelectric conversion function of the transceiver. All PCBs which match with the BOSAs are respectively 103, 203 and so on, as shown in FIG. 3, and are also able to be combined into one. The PCBs are respectively connected with the BOSAs through the flexible printed circuit board. Specifically, every BOSA comprises PINs for the transmitters and PINs for the receivers, wherein the PINs for the transmitters are electrically connected with the PCB by the FLEX, the PINs for the transmitters are electrically connected with the PCB by the FLEX, as shown in reference numeral 0003 of FIG. 4.

Figure 5:
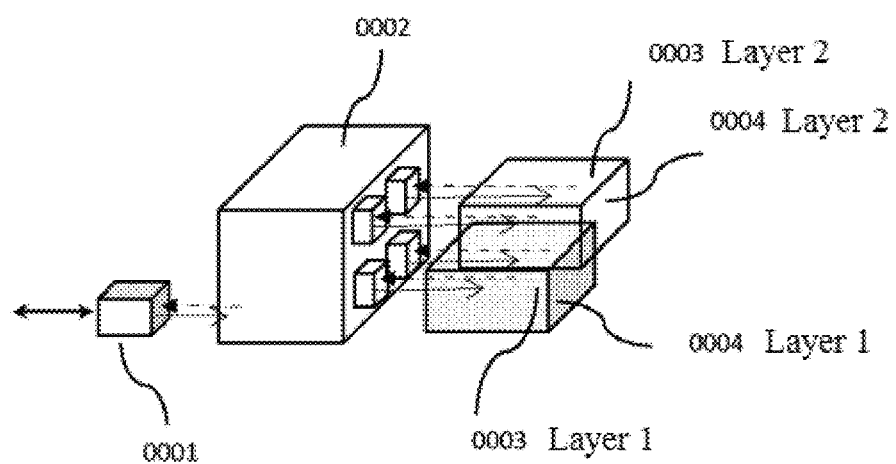
FIG. 5 is a schematic view of a BOSA which is able to be stacked horizontally in the transceiver provided by the present invention.

FIG. 5 is a structurally schematic view of a BOSA which is horizontally disposed within the transceiver housing, in which the WDM system is changed. When the WDM system 0002 adopts the multiple cascading design, the transmitters 0004 and the transmitters 0003 are also arranged in a stacked manner (referring to layer 1 and layer 2 in FIG. 5), and respectively connected with the fiber receptacle 102 on the BOSA through the single fiber bidirectional optical interface 0001. Through the mode, the BOSA is controlled within 6 mm×36 mm×7 mm in size and is able to be packaged in the QSFP-DD transceiver with a standard size of 18.35 mm×72 mm×8.5 mm, and a same horizontal plane of the transceiver is able to be provided with two BOSAs.

Figure 6:
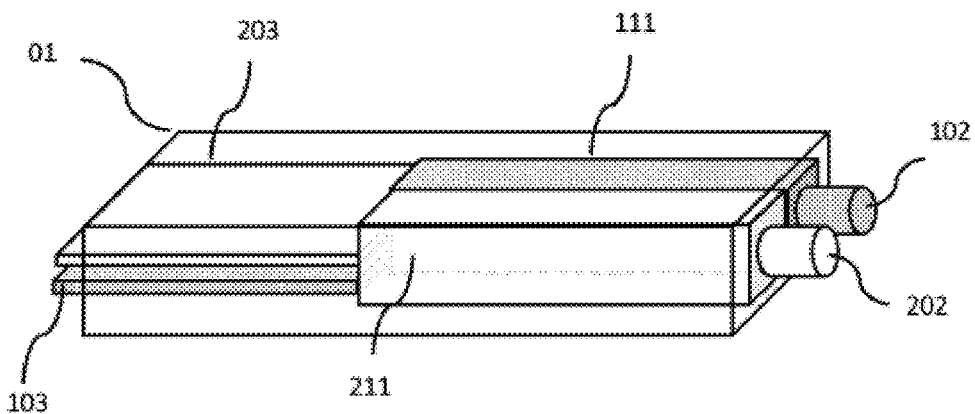
FIG. 6 is a structurally schematic view of BOSAs which are stacked horizontally in the transceiver according to a preferred embodiment of the present invention.

As shown in FIG. 6, a transceiver according to another preferred embodiment of the present invention is illustrated. According to the preferred embodiment, two BOSAs are stacked in the horizontal direction, reference numeral 111 refers to a first N-wavelength-channel BOSA disposed in the transceiver housing, reference numeral 102 is a fiber receptacle on the first N-wavelength-channel BOSA, reference numeral 103 is a PCB which matches with the first N-wavelength-channel BOSA and is connected with the first N-wavelength-channel BOSA 111 through an FLEX; reference numeral 211 is a second N-wavelength-channel BOSA stacked in the transceiver housing, reference numeral 202 is a fiber receptacle on the second N-wavelength-channel BOSA, reference numeral 203 is a PCB which matches with the second N-wavelength-channel BOSA and is connected with the second N-wavelength-channel BOSA 211 through the FLEX, all of which are disposed within the transceiver housing 01, so as to realize the photoelectric conversion function of the transceiver.

Figure 7:
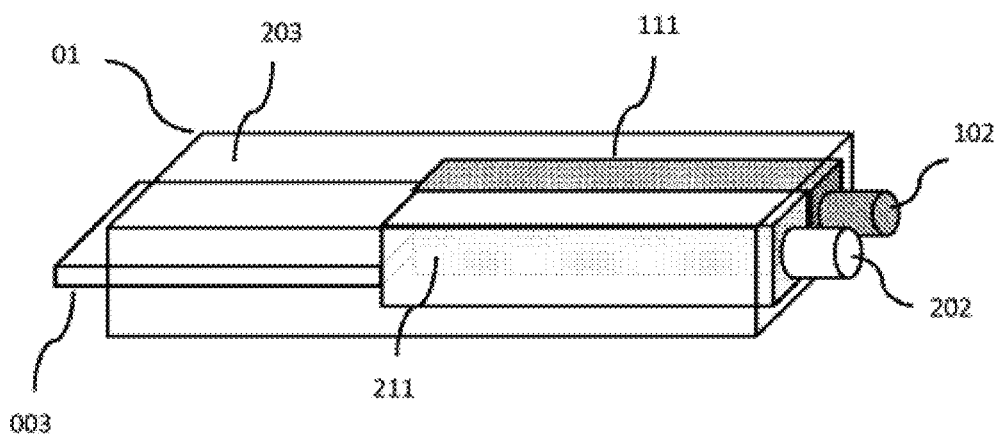
FIG. 7 is a structurally schematic view of BOSAs which are stacked horizontally in the transceiver according to another preferred embodiment of the present invention.

Similarly, all PCBs which match with the BOSAs are respectively 103, 203 and so on, as shown in FIG. 6, and are also able to be combined into one. The PCBs are respectively connected with the BOSAs through the FLEX. Specifically, every BOSA comprises PINs for the transmitters and PINs for the receivers, wherein the PINs for the transmitters are electrically connected with the PCB by the FLEX, the PINs for the receivers are electrically connected with the PCB by the FLEX, as shown in reference numeral 0003 of FIG. 7.

Figure 8:
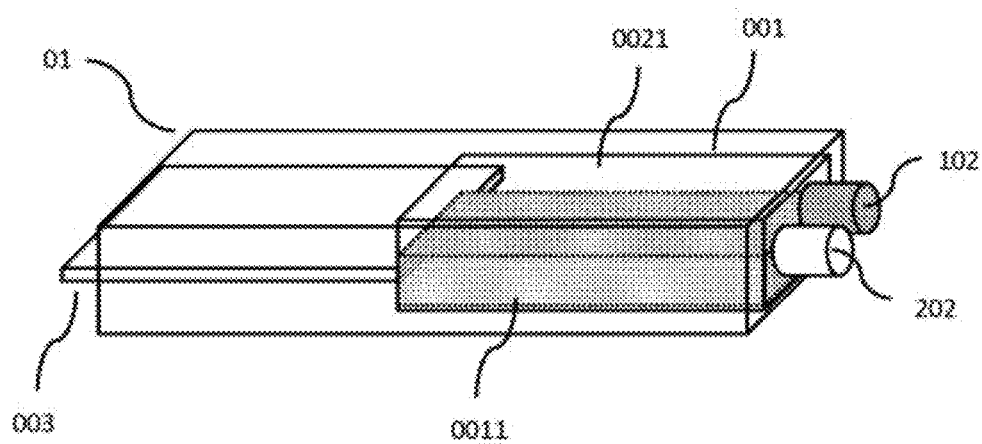
FIG. 8 shows that multiple BOSAs are packaged into a transceiver housing.

Further, as shown in FIG. 8, during the packaging process, a first group of N-wavelength-channel transceivers 0011 is packaged at a first layer in the horizontal direction within a same transceiver housing 01, and is communicated with the outside through a fiber receptacle 102 on the transceiver housing 01; a second group of N-wavelength-channel transceivers 0021 is packaged at a second layer in the horizontal direction within the same transceiver housing 01, and is communicated with the outside through another fiber receptacle 202 on the transceiver housing 01.

Further, the fiber receptacles in the present invention are not limited to two, but are also able to be extended to multiple channels, such as an MPO (multi-fiber push on) interface. The transceiver should also not be limited to the QSFP-DD mode.

The above is only the preferred embodiment of the present invention, and is not intended to limit the scope of the present invention, and equivalent changes or modifications made in accordance with the scope of the present invention are covered by the present invention.

What is claimed is:

1. A transceiver with multi-wavelength coexistence, wherein:

M BOSAs (bi-direction optical sub-assemblies) and M fiber receptacles are disposed within a transceiver housing; a PCB (printed circuit board) is horizontally placed in the transceiver housing; each of the fiber receptacles is disposed on each of the BOSAs; the each of the BOSAs comprises N transmitters and N receivers all of which are optically coupled with the each of the fiber receptacles and electrically connected with the PCB; the M BOSAs, which are stacked vertically or horizontally, are respectively connected with an external fiber through the M fiber receptacles, wherein M≥2 and N≥2;

the each of the BOSAs further comprises a WDM (wavelength division multiplexing) system and a single fiber bidirectional optical interface, wherein the N transmitters respectively transmit N emitted light beams with different wavelengths, the N receivers respectively receive N incident light beams with different wavelengths, the emitted light beams and the incident light beams respectively enter and exit from the fiber receptacles, and share the WDM system and the single fiber bidirectional optical interface in a transmission path;

the N transmitters and the N receivers are arranged in a one-to-one interlaced manner, and the N emitted light beams with different wavelengths and the N incident light beams with different wavelengths are transmitted in the one-to-one interlaced manner.

2. The transceiver with multi-wavelength coexistence, as recited in claim 1, wherein: the single fiber bidirectional optical interface is an optical circulator.

3. The transceiver with multi-wavelength coexistence, as recited in claim 1, wherein: a size of the each of the BOSAs is within 12 mm×36 mm×3.5 mm or 6 mm×36 mm×7 mm.

4. The transceiver with multi-wavelength coexistence, as recited in claim 2, wherein: a size of the each of the BOSAs is within 12 mm×36 mm×3.5 mm or 6 mm×36 mm×7 mm.

5. The transceiver with multi-wavelength coexistence, as recited in claim 3, wherein: the each of the fiber receptacles is an LC interface or an MPO (multi-fiber push on) interface.

6. The transceiver with multi-wavelength coexistence, as recited in claim 4, wherein: the each of the fiber receptacles is an LC interface or an MPO (multi-fiber push on) interface.

7. The transceiver with multi-wavelength coexistence, as recited in claim 3, wherein: the transceiver comprises one or two PCBs.

8. The transceiver with multi-wavelength coexistence, as recited in claim 4, wherein: the transceiver comprises one or two PCBs.

9. The transceiver with multi-wavelength coexistence, as recited in claim 6, wherein: the transceiver further comprises a flexible printed circuit board (FLEX), wherein the each of the BOSAs is electrically connected with the PCB through the FLEX; the each of the BOSAs comprises PINs for the transmitters and PINs for the receivers, wherein the PINs for the transmitters are electrically connected with the PCB by the FLEX, the PINs for the receivers are electrically connected with the PCB by the FLEX.

10. The transceiver with multi-wavelength coexistence, as recited in claim 8, wherein: the transceiver further comprises a flexible printed circuit board (FLEX), wherein the each of the BOSAs is electrically connected with the PCB through the FLEX; the each of the BOSAs comprises PINs for the transmitters and PINs for the receivers, wherein the PINs for the transmitters are electrically connected with the PCB by the FLEX, the PINs for the receivers are electrically connected with the PCB by the FLEX.

11. The transceiver with multi-wavelength coexistence, as recited in claim 1, wherein: M=2 and N=4.

12. The transceiver with multi-wavelength coexistence, as recited in claim 6, wherein: M=2 and N=4.

13. The transceiver with multi-wavelength coexistence, as recited in claim 8, wherein: M=2 and N=4.

14. The transceiver with multi-wavelength coexistence, as recited in claim 1, wherein: a wavelength of a transmitting channel of each of the N transmitters is as same as a wavelength of a receiving channel of one of the N receivers which is corresponding to the each of the N transmitters.

15. A transceiver with multi-wavelength coexistence, wherein:

M BOSAs (bi-direction optical sub-assemblies) and M fiber receptacles are disposed within a transceiver housing; a PCB (printed circuit board) is horizontally placed in the transceiver housing; each of the fiber receptacles is disposed on each of the BOSAs; the each of the BOSAs comprises N transmitters and N receivers all of which are optically coupled with the each of the fiber receptacles and electrically connected with the PCB; the M BOSAs, which are stacked vertically or horizontally, are respectively connected with an external fiber through the M fiber receptacles, wherein M≥2 and N≥2;

the transceiver further comprises a flexible printed circuit board (FLEX), wherein the each of the BOSAs is electrically connected with the PCB through the FLEX; the each of the BOSAs comprises PINs for the transmitters and PINs for the receivers, wherein the PINs for the transmitters are electrically connected with the PCB by the FLEX, the PINs for the receivers are electrically connected with the PCB by the FLEX.

16. The transceiver with multi-wavelength coexistence, as recited in claim 15, wherein: a wavelength of a transmitting channel of each of the N transmitters is as same as a wavelength of a receiving channel of one of the N receivers which is corresponding to the each of the N transmitters.

* * * * *